(12) United States Patent  (10) Patent No.: US 7,889,401 B2
Carlson et al.  (45) Date of Patent: Feb. 15, 2011

(54) FLOATING SCAN SENSOR IN A MULTI-FUNCTION PRINTER

(75) Inventors: Gregory F. Carlson, Corvallis, OR (US); Steven Goss, Corvallis, OR (US); Patrick A. McKinley, Corvallis, OR (US); Randall Stockberger, Independence, OR (US); Ronald G. Paul, Corvallis, OR (US); Todd A. McClelland, Corvallis, OR (US); Roger Switzer, Vancouver, WA (US)

(73) Assignee: Marvell International Ltd. (BM)

( * ) Notice: Subject to any disclaimer, the term of this patent is extended or adjusted under 35 U.S.C. 154(b) by 907 days.

(21) Appl. No.: 11/755,686

(22) Filed: May 30, 2007

(65) Prior Publication Data

US 2008/0049271 A1  Feb. 28, 2008

Related U.S. Application Data

(60) Provisional application No. 60/810,103, filed on Jun. 1, 2006.

(51) Int. Cl.
 *H04N 1/04* (2006.01)
(52) U.S. Cl. ........................ 358/498; 358/474
(58) Field of Classification Search ................. 358/498, 358/474, 494, 488; 382/293, 312
 See application file for complete search history.

(56) References Cited

U.S. PATENT DOCUMENTS

| 4,706,125 A | 11/1987 | Takagi |
| 5,124,800 A | 6/1992 | Hashimoto |
| 5,127,644 A | 7/1992 | Yoshihiro et al. |
| 5,196,691 A | 3/1993 | Kitani et al. |
| 5,587,812 A | 12/1996 | Kasuya |
| 5,727,890 A | 3/1998 | Stodder et al. |
| 5,749,570 A | 5/1998 | Iwata et al. |
| 5,751,448 A | 5/1998 | Kim et al. |
| 5,833,381 A | 11/1998 | Kellogg et al. |
| 5,896,206 A | 4/1999 | Kellogg |
| 6,101,291 A * | 8/2000 | Arney et al. ................. 382/293 |
| 6,942,211 B2 | 9/2005 | Teo et al. |
| 7,349,127 B2 | 3/2008 | Kadomatsu |

(Continued)

FOREIGN PATENT DOCUMENTS

EP  1 424 848 A1  6/2004

(Continued)

OTHER PUBLICATIONS

International Search Report dated Feb. 28, 2008 for International Application No. PCT/US2007/012962.

(Continued)

*Primary Examiner*—Charlotte M Baker

(57) ABSTRACT

A multifunction printer having a compact size and portable configuration while providing printing, scanning and copying functionalities is disclosed. The multi-function printer may include a paper handling assembly and a floating scanner assembly pivotably coupled to the paper handling assembly. The multi-function printer may further include a printer assembly coupled to the paper handling assembly. The floating scanner assembly is coupled to and aligned with a pick roller portion of the paper handling assembly and configured to scan and/or otherwise operate on a media supported within a document feeder. Thus, the multi-function printer may provide a wide variety of functionalities while maintaining a desirable compact configuration and portability.

21 Claims, 7 Drawing Sheets

U.S. PATENT DOCUMENTS

| | | | |
|---|---|---|---|
| 7,536,148 | B2 | 5/2009 | Fukumura |
| 2004/0186923 | A1 | 9/2004 | Seto |
| 2004/0190081 | A1 | 9/2004 | Kadomatsu |
| 2004/0190082 | A1 | 9/2004 | Seto |
| 2005/0053183 | A1 | 3/2005 | Abe et al. |
| 2006/0050329 | A1 | 3/2006 | Yokota |
| 2006/0274383 | A1* | 12/2006 | Ha et al. ................. 358/498 |
| 2007/0052164 | A1 | 3/2007 | Watase et al. |
| 2008/0151328 | A1* | 6/2008 | Gregerson et al. .......... 358/494 |

FOREIGN PATENT DOCUMENTS

| | | |
|---|---|---|
| EP | 1424848 | 6/2004 |
| FR | 2 859 806 | 3/2005 |
| FR | 2859806 | 12/2005 |

OTHER PUBLICATIONS

International Search Report dated Feb. 15, 2008 for International Application No. PCT/US2007/012961.

Copending U.S. Appl. No. 11/755,665, filed May 30, 2007 (Publication No. 2008-0024840-A1, dated Jan. 31, 2008).

* cited by examiner

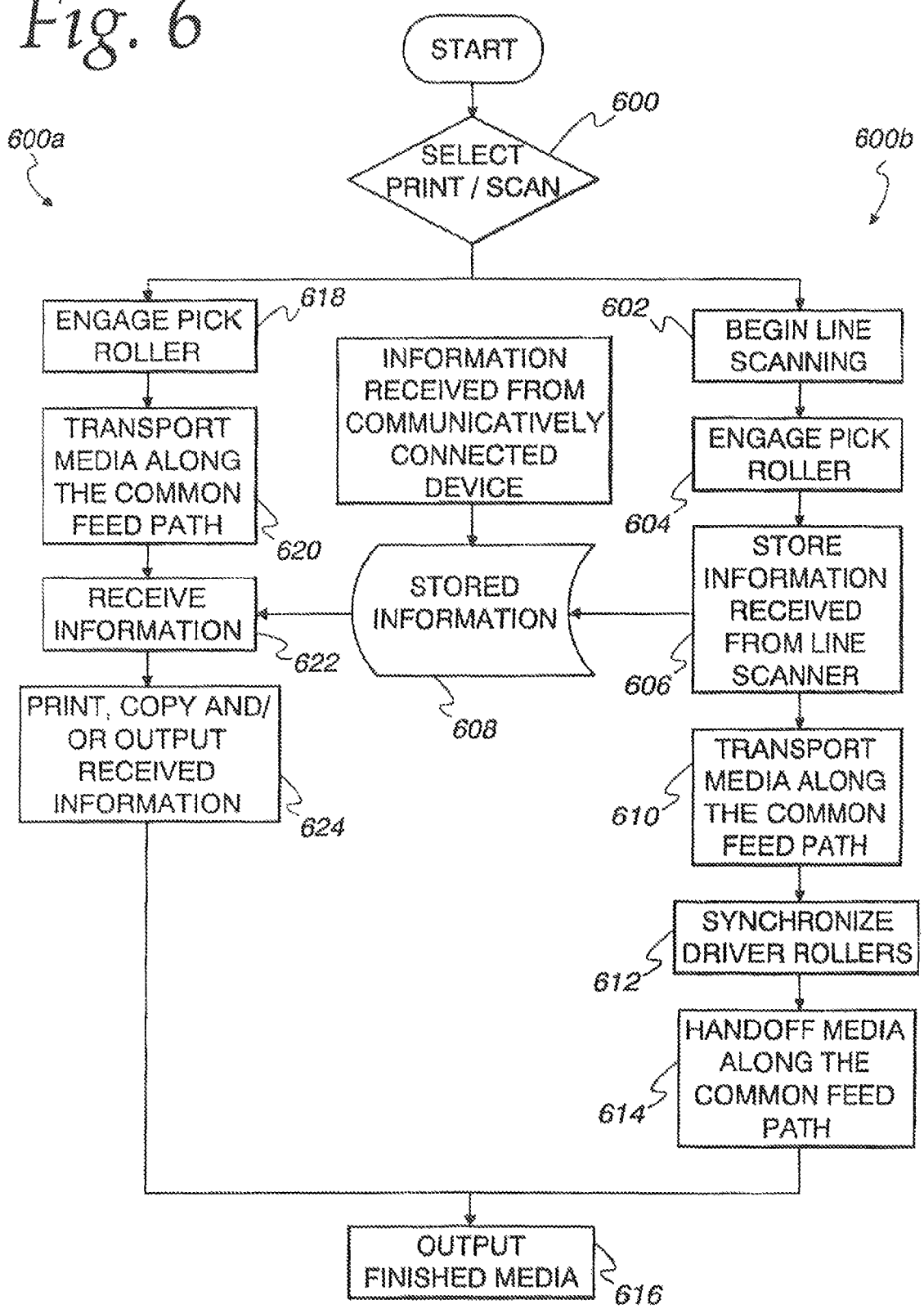

FLOATING SCAN SENSOR IN A MULTI-FUNCTION PRINTER

CROSS REFERENCE TO RELATED APPLICATIONS

This patent application is related to commonly-assigned U.S. patent application Ser. No. 11/755,665, filed concurrently, titled, "Print and Scan Sharing Paper Pick and Paper Motion Control in a Multi-Function Printer", the contents of which are incorporated herein for all purposes.

This patent application claims the priority benefit under 35 U.S.C. §119(e) of U.S. provisional patent application Ser. No. 60/810,103, filed on Jun. 1, 2006, titled "Floating Scan Sensor in a Multi-Function Printer."

The contents (of these patent applications are incorporated herein for all purposes.

TECHNICAL FIELD

The present disclosure generally relates to multi-function printers, and more specifically to compact multi-function printers that include a floating scan sensor.

BACKGROUND

Multi-function printers, e.g., printers capable of printing, scanning and/or transmitting a facsimile, are well known. Some multi-function printers include a separate printer assembly coupled to a scanner assembly. The printer assembly works in any known manner to produce physical representations of provided data such as, for example, text documents, images or combinations thereof. The scanner assembly often includes a flat glass plate upon which an object to be scanned can be placed or automatically loaded. A scanning device is translated relative to the flat glass plate and the object to be scanned, and an image representative of the scanned object is stored into a memory. The stored image, in turn, is communicated to the printer assembly for reproduction.

Known multi-function printers, while operable for many activities, are often large enough to make transportation difficult. Moreover, the size or footprint of the multi-function printer requires a large amount of workspace to easily and effectively utilize the device. These known multi-function printers typically include two feed or paper paths to control and direct the movement of paper and other flexible media to the printer and scanner assemblies. The mechanisms and components of these duplicate paths increase the overall cost, size and complexity of these known multi-function printers.

It would be desirable to provide a multi-function printer having reduced mechanical and electrical complexity and cost. It would further be desirable to provide a multi-function printer that was portable and sized for efficient use, in confined or space limited environments.

SUMMARY

The present disclosure provides exemplary embodiments of a multi-function printer system having floating scanning head, these exemplary embodiments are intended to highlight and disclose the teachings of the present invention and are not intended to limit or narrow the scope of protection sought. The exemplary multi-function printer system includes a document feeder configured to support a medium, a pick mechanism configured to engage the medium. The multi-function printer system further includes a floating scanner assembly pivotably coupled to the pick mechanism and arranged to flushly engage a surface of the medium when the medium is supported within the document feeder.

In another embodiment, a method for configuring a multi-function printer includes providing a document feeder configured to support at least one piece of medium, providing a pick mechanism having a pick roller, the pick roller having a centerline and a surface, wherein the surface is configured to engage a surface of the at least one piece of medium and providing a floating scanner assembly pivotably mounted to the pick roller.

In another embodiment, a multi-function printer includes means for feeding documents configured to support a medium, means for picking documents configured to engage the medium and means for scanning pivotably coupled to the pick mechanism. The means for picking documents and means for scanning are arranged to flushly engage a surface of the medium, when the medium is supported within the means for feeding documents.

Additional features and advantages of the present invention are described in, and will be apparent from, the following Detailed Description and the figures.

BRIEF DESCRIPTION OF THE FIGURES

FIG. 6 is a flow chart illustrating one example of the functions or steps that may be performed during the operation of a multi-function printer constructed in accordance with the teachings of the present disclosure.

DETAILED DESCRIPTION

The embodiments and concepts discussed herein provide for a multi-function printer having a compact size and portable configuration while providing printing, scanning and copying functionalities. The exemplary multi-function printer includes a printer assembly and a floating scanner assembly configured to cooperatively utilize the same pick and paper movement systems along a common feed path to perform these printing, scanning and copying functions. Thus, a multi-function printer constructed in accordance with the teaching and disclosure provided herein may utilize a less complex paper movement and control system while, in turn, providing a compact and robust floating scanner assembly.

Figure 1:
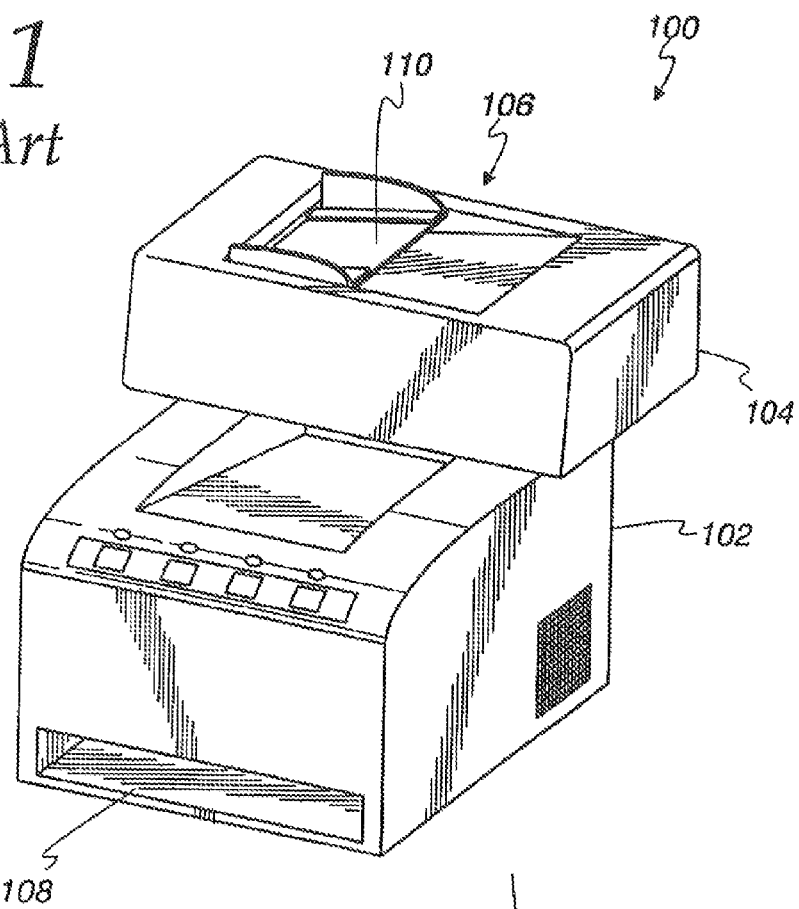
FIG. 1 is a perspective view of a prior art multi-function printer.

FIG. 1 illustrates a prior art multi-function printer 100. The multi-function printer 100 includes a printer 102, a scanner 104 and a document feeder 106. The printer 102 includes a paper tray 108 coupled to a fuser and toner system (not shown) or an ink jet delivery system (not shown). The printer 102 includes paper handling and movement systems to transport media from the paper tray 108 to, for example, the fuser and toner to produce printed documents. The scanner 104 and document feeder 106 include duplicate paper handling and movement systems to transport media positioned in an input tray 110 of the document feeder 106 for scanning via a flat plate scanner (not shown). The scanner 104 and document feeder 106 are shown mounted transversally upon the printer 102 and are configured to share data therebetween. However, the mounting of the scanner 104 and document feeder 106 is not limited to a transverse orientation, but may be arranged in other orientations and configurations such as in a sheet-fed facsimile machine. Many of these devices include a scanner paper path directly above a printer paper path to allow both original and printed papers to move along the individual paper paths in the same orientation and/or at substantially the same time. In operation, a document may be transported and scanned via the scanner 104 and the document feeder 106. Image data representative of the document may be communicated to the printer 102 for storage, printing or further communication to another connected or networked device. If, for example, the image data is to be printed, media is selected from the paper tray 108 and transported via the printer's paper handling and movement system to, for example, the fuser and toner to produce the desired document copy or image.

Figure 2:
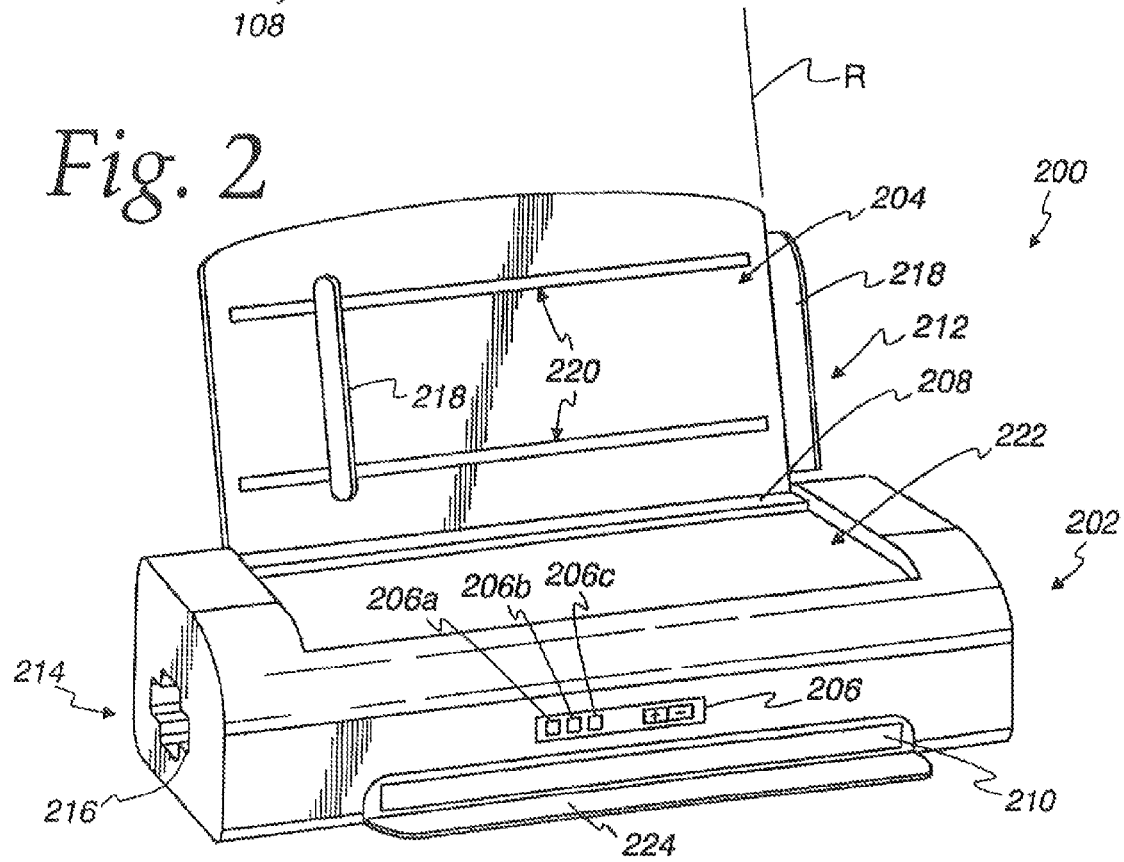
FIG. 2 is a perspective view of one embodiment of a multi-function printer constructed in accordance with the teachings of the present disclosure.

FIG. 2 illustrates one embodiment of a multi-function printer (MFP) 200 constructed in accordance with the teachings and disclosure provided herein. The MFP 200, in this exemplary embodiment, is a portable multi-function printer configured to print, scan, copy and/or transmit facsimile copies of documents or images. For example, the MFP 200 may weigh approximately 5 lbs (approximately 2.3 kgs) and measure approximately 13 inches in width, 3 inches in height and have a depth of approximately 7 inches (approximately 33 cm×7.6 cm×17.8 cm). A device of this size is desirable, for example, for professionals or the like who frequently travel or otherwise work outside of an office where transporting a larger device, such as the multi-function printer 100, would be impractical.

The MFP 200 includes a base or housing 202 hingedly coupled to a paper support or cover 204. In a first or closed position, the cover 204 engages the housing 202 in a transportation configuration. In a second, or open position, the cover 204 is pivoted away from the housing 202 to, for example, a 45 degree angle relative to the housing, for use in operation. The MFP 200 may be configured to feed, print, scan and otherwise handle various sizes and types of documents and media such as: paper, vellum, card stock, transparencies, etc.

In this exemplary embodiment, the base 202 is configured and designed to serve as part of a portable print device, therefore clean and ergonomic styling may be desirable to facilitate transportation and storage of the device. For example, the cover 204 may, in the closed position, provide protection for the print mechanism housed within the base 202 and/or the controls 206 positioned on the base 202. Alternatively, the controls 206, which may include, for example, a power button 206a, indicator lights or LEDs 206b, and/or a toggle 206c, can be positioned on the front portion of the base 202 for easy access.

The base 202 further includes a media input 208 coupled to a media outlet 210. In this embodiment, the media input 208 is a slot sized to accept media, paper, etc., and is aligned adjacent to the cover 204. For example, when the cover 204 is in the open position, the interior surface of the cover 204 smoothly transitions into the media input 208. Thus, any media, such as paper, vellum, etc., placed within the media input 208 is smoothly guided and supported along the inner surface of the cover 204. The supported media is, in turn, aligned into the desired position within the media input 208 and the base 202. Upon execution of a function such as, for example, printing and/or scanning, the media loaded via the media input 208 and the cover 204 will be unloaded or ejected through the media outlet 210. In this way, media may pass from a substantially vertical orientation in the document feeder 212, which may include both the cover 204 and the media input 208, through the body 202 which houses the multi-function printer componentry, and exits the MFP 200 in a substantially horizontal orientation via the media outlet 210.

The body 202 may further include one or more data inputs and data outputs. For example, the body 202 includes a card reader 214. The card reader 214 includes a horizontally aligned slot 216 sized to accept a variety of digital media cards (not shown). The digital media cards could be, for example, a secure digital (SD) card: a MultiMediaCard (MMC), a SmartMedia card or a CompactFlash card. Digital media cards such as these are often available with storage capacities between 8 MB (megabytes) and 4 GB (gigabytes). These media cards are often used to storage digital images, digital movies or movie clips, audio files, etc. Thus, by aligning and inserting a digital media card into the slot 216 of the card reader 214, digital information may be transferred directly to the MFP 200. Alternatively, the MFP 200 may include, a USB (universal serial bus) connector; an Ethernet connector such ,as an RJ-45 socket; a telephone or modem connector; a WiFi connector for communicating with a wireless local area network (WLAN); and a Bluetooth connect or for communicating with a personal area network (PAN). Regardless of the interface chosen, the MFP 200 can be configured to directly accept, convert and process digital images and files for printing, scanning and transmission.

The cover 204, in cooperation with the media input 208, can act as a document feeder or organizer 212. The document feeder 212 can, in other embodiments, be an automatic document feeder that includes a dedicated, integrated paper handling system. The paper handling system could include a separate media movement or drive system as well as spring loaded media alignment and registering devices. Alternatively, the cover 204 may include one or more adjustable guide bars 218 to align and reference media. These guide bars 218 may laterally traverse along ridges or guides 220, relative to each other, to register the media along a desired edge such as the right edge R of the cover 204. In this way, the media may be squarely aligned within the media input 208 to reduce or eliminate unwanted scanning or printing skew from or to the media.

The cover 204, when in the second or closed position, may engage a top portion of the base 202. Alternatively, the cover 204 may flushly engage a recessed portion or pocket 222. The pocket 222 may provide esthetic appeal to the base 202 by hiding and smoothing the overall appearance of the MFP 200. The pocket 220 may functionally provide protection from dirt or other contaminants entering the base 202 via the media input 208 or other open access path. Similarly, the media outlet 210 may be engaged or protected by an outlet cover 224. The outlet cover 224 can be hingedly attached to the base 202 or may simply extend away from the base 202 and include a flexible barrier (not shown) to provide contaminant protection. The flexible barrier may be, for example, overlapping or non-overlapping strips of plastic or a brush-like mesh arrayed over the outlet. The outlet cover 224 may further act as a supplemental media guide for the media traveling through the media outlet 210.

Figure 3:
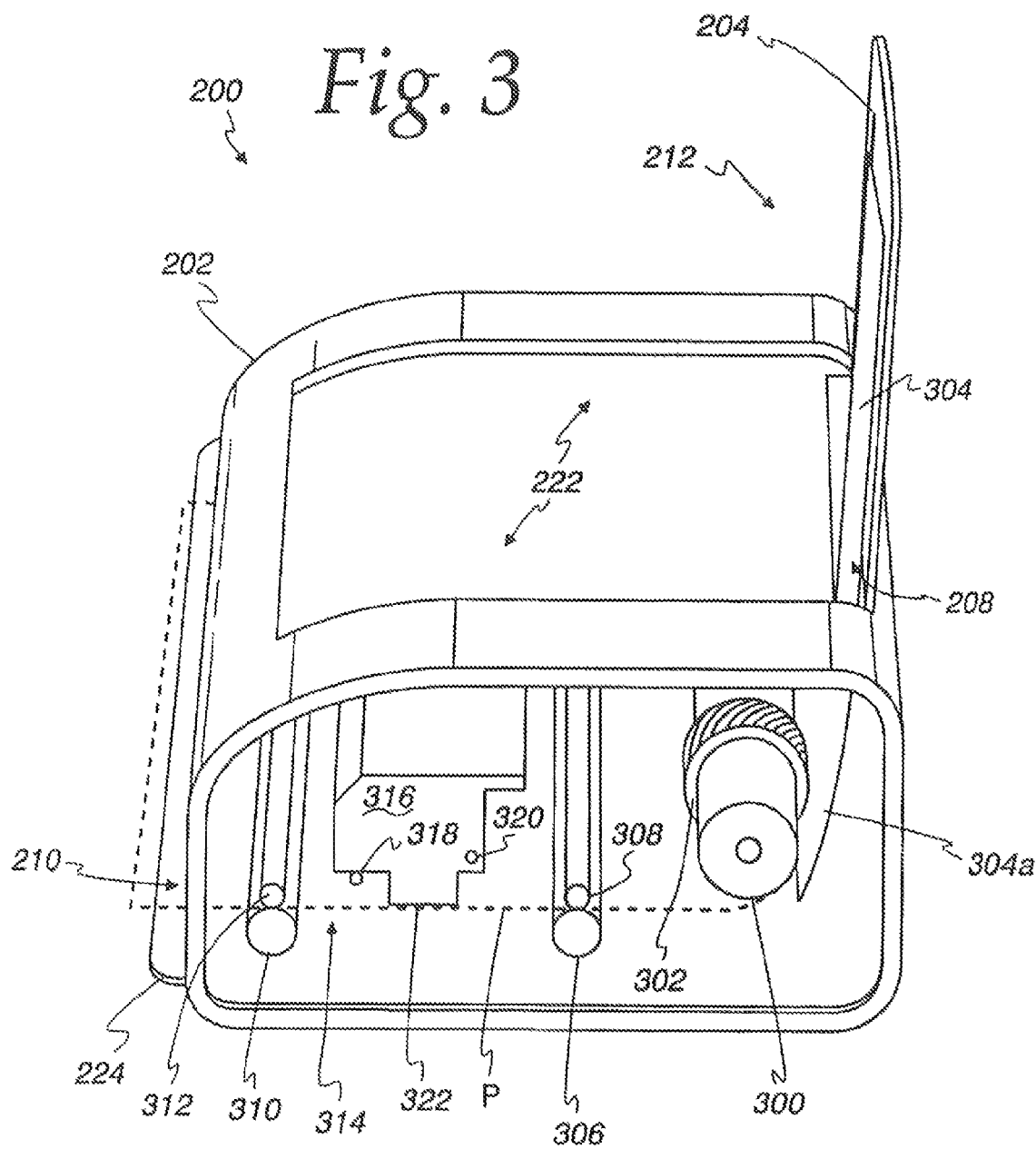
FIG. 3 is a simplified cut-away side view of the multi-function printer shown in FIG. 2.

FIG. 3 generally illustrates a simplified, sectional side view of the MFP 200. The sectional side view of the MFP 200 allows normally enclosed, and hidden, printer componentry to be viewed. It will be understood that in the perspective view shown, the body 202 and cover 204 of the MFP 200 extend longitudinally into the page.

The MFP 200 includes a pick shaft 300 and pick roller 302 portions of the document feeder 212. The pick shaft 300 extends roughly the width of the base 202, i.e., the shaft extends longitudinally into the page. The pick shaft 300 may be a solid or rigid shaft coupled to a drive motor (not shown) housed within the base 202. The pick roller 302 may be a single sleeve or cylinder that extends along the length of the pick shaft 300. Alternatively, the pick roller 302 may comprise a series of rings or collars spaced along the length of the pick shaft 300. While this configuration increases the total number of elements that constitute the pick roller 302, the amount of raw material necessary to perform the picking function is reduced because the pick roller 302 does not extend the entire length of the pick shaft 300.

FIG. 3 illustrates one exemplary embodiment of the MFP 200 with media, e.g., one or more sheets of paper 304, loaded within the media input 208 and resting against and supported by the cover 204. For example, if the paper 304 is A4 paper or 8.5 in.×11 in. paper, then the long edge of the paper 304 extends into the media input slot. In this arrangement, the short end of the paper 304 extends into the page and the surface of the paper 304 rests substantially flushly against the surface of the cover 204. A leading edge 304a of the paper 304 abuts or rests in contact against the pick roller 302 when the paper 304 is loaded into the document feeder 212. In operation, when the drive motor engages and rotates the pick shaft 300, the attached pick roller 302 is engaged and rotated as well. As the pick shaft 300 and the pick roller 302 rotate, the outer surface of the pick roller 302 frictionally engages the leading edge 304a of the paper 304 and feeds it into a common feed or paper path, identified by the dashed line and the reference identifier P.

The paper 304, once engaged by the pick roller 302, is guided along the common feed path P to a first roller 306. The first roller 306 may be a drive roller, e.g., the first roller 306 may be directly or indirectly coupled to another drive motor to direct and urge the paper 304 along the common feed path P. The first roller 306 may be aligned with and cooperatively coupled to a first free roller 308. The first roller 306 and the first free roller 308 may be collectively referred to as first rollers 306, 308. The first free roller 308 can be positioned adjacent to the first roller 306 to engage the paper 304 as it moves along the common feed path P. These first rollers 306, 308 may be employed to urge and provide smooth transitions from the substantially vertical position adjacent to the pick roller 302 to a substantially horizontal position along the common feed path P.

A second roller 310 and a second free roller 312 can be arranged and positioned away from the first rollers 306, 308. The second roller 310 and the second free roller 312 may be collectively referred to as second rollers 310, 312. The second rollers 310, 312 may be positioned and aligned near the media outlet 210. As with the first roller 306, the second roller 310 may be directly or indirectly coupled to a drive motor and operate as a driven roller to urge the paper 304 along the common feed path P. The second free roller 312, in turn, may cooperate with the second roller 310 to control the movement of the paper 304. As shown in this exemplary embodiment, the first rollers 306, 308 cooperate with the second rollers 310, 312 to support the paper 304 and establish a stable print area 314.

A print head 316 may be positioned above the print area 314 of the extended paper 304. The print head 316, in this exemplary embodiment, represents an inkjet print head and ink cartridge. However, it will be understood that a fuser and a toner cartridge assembly from a laser printer could be utilized without departing from the teachings of the disclosure provided herein. Thus, it will be further understood that as used herein, the terms printer, print head, printer assembly, etc. can be used to denote inkjet assemblies, laser printer assemblies, dot-matrix printer assemblies and/or any other known ink deposition system. The various print technologies and systems disclosed herein may be collectively referred to as the printer assembly 324.

The print head 316 can be slideably mounted to a pair of guide rods 318, 320. The guide rods 318, 320 support the print head 316 above the print area 314 of the paper 304. An alternate embodiment could utilize a single guide rod with an adjacent sheet metal or plastic guide bar arranged to prevent rotation of the print head 316 around the guide rod. This arrangement allows a print orifice 322 aligned above the paper 304 to deposit ink or toner upon the paper surface. The print head 316 may include a drive motor to translate the unit along the guide bars 318, 320 or may be, for example, coupled to and driven by a belt and pulley arrangement.

Figure 4:
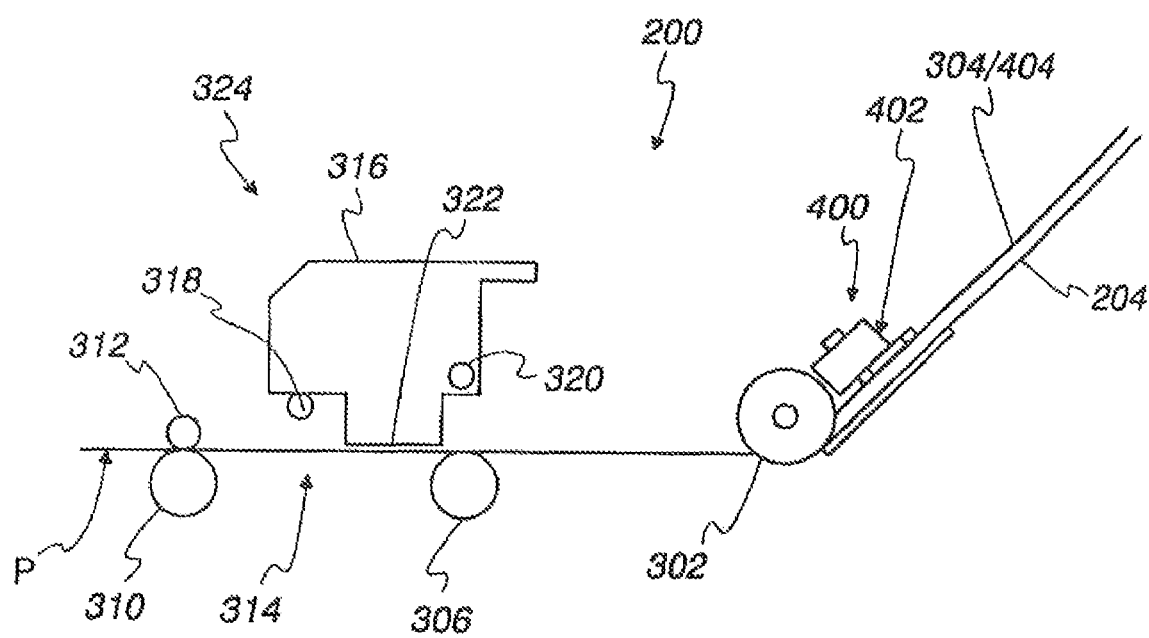
FIG. 4 is a simplified side view of the multi-function printer shown in FIG. 2.

FIG. 4 illustrates simplified side view of one embodiment of the MFP 200 constructed in accordance with the teachings presented herein. FIG. 4 illustrates one embodiment of the MFP 200 that includes the printer assembly 324 mounted substantially adjacent to a floating scanner assembly 400. The printer assembly 324, as discussed above in connection with FIG. 3, is positioned adjacent to the print area 314 defined between the first rollers 306, 308 and the second rollers 310, 312. The floating scanner assembly 400 includes a line scanner 402 mounted substantially adjacent to the pick roller 302.

The line scanner 402 may be a sensor such as Contact Image Sensor (CIS). The CIS may be a monochrome (black and white) or a color sensor depending on the desired application, etc. The color sensor may include red, green and blue light-emitting diode arrays arranged to illuminate the image to be scanned. Each color of the array may be activated or turned-on in a predefined or rotating sequence to illuminate the image in a desired manner. During each activated or on time of a diode array, the light reflected from the image being scanned is captured by the light sensing elements of the CIS. The light sensing elements, in turn, generate electrical signals proportional to amount of light received by each element. The generated electrical signals may be serially scanned out to an analog to digital (A/D) converter to begin image processing. The converted digital values provided by the A/D converter may then be stored in a memory (not shown) for use by the system process (not shown).

In this exemplary embodiment, the line scanner 402 is aligned and mounted along the angled cover 204 and the media input 208 of the document feeder 212 (see FIGS. 2 and 3). Thus, if media-t0-be-scanned 404 is loaded into the document feeder 212 facing away from the surface of the cover 204, i.e., towards the line scanner 402, the text of images on the media can be scanned. processed or optically recognized by the line scanner 402. For example, as the pick roller 302 and pick shaft 300 are rotated via the drive motor, the media-to-be-scanned 404 is frictionally engaged and transported along the common feed path P. In other words, as the media-to-be-scanned 404 is engaged by the pick roller 302 and enters the common feed path P, the information on the media passes beneath the line scanner 402 for processing. thus, by loading the media-to-be-scanned 404 into the document feeder 212 and transporting it along the common feed path P, the images and text can be processed by the line scanner 402. A paper loading lever 401 can be incorporated into the floating scanner assembly 400 to allow the operator to lift the line scanner 402, etc. away from the cover 204. This, in turn, allows the paper 304 to be easily loaded.

Similarly, as described above, the paper 304 or other media can be loaded into the document feeder 212 and transported along the common feed path P for printing at the printing area 314. In this way, the MFP 200 can scan images and make prints copies, etc. of stored images and/or information utilizing the common feed path P and the same document feeder 212 and paper feed and handling mechanisms. It will be understood that the floating scanner assembly 400 may be mounted between the pick roller 302 and the print head 316, in order to scan or image the media-to-be-scanned 404 as it enters the common feed path P, after leaving contact with the pick roller 302.

Figure 4A:
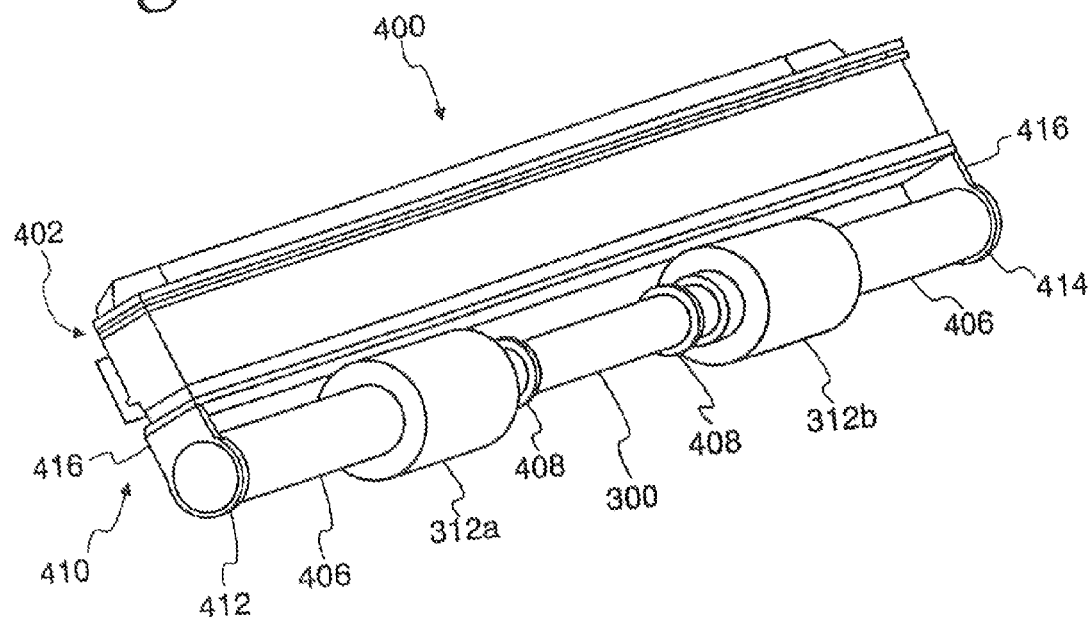
FIG. 4A is a simplified view of one embodiment of a floating scanner assembly.

FIG. 4A illustrates a perspective view of one embodiment of the floating scanner assembly 400. The pick shaft 300 extends longitudinally along the length of the floating scanner assembly 400 and supports first and second pick rollers 312a and 312b. The first and second pick rollers 312a, 312b are made of a rubber material selected to loaded pressure plate 403 to rotatably engage the paper 304. provide friction against the surface of the paper 304 when they cooperating with a spring A scanner bracket 410 is rotatably secured to stationary bushings 406 that supports a first end 412 and a second end 414 of the pick shaft 300. In particular, a pair of flanges 416 engages the outer radius of the stationary bushings 406. The pick shaft 300 rotates freely along the inner radius of the stationary bushings 406. This configuration allows the rotation of the pick shaft 300 to be isolated from the flanges 416 of the scanner bracket 410. In this example, the scanner bracket 410 is secured to the stationary bushings 406 to allow free rotation of the pick shaft 300 and the associated feed mechanisms while maintaining the overall alignment and orientation of the floating scanner assembly 400. For example, while the pick shaft 300 rotates freely with respect to the stationary bushings 406, the scanner bracket 410 remains fixed and aligned relative to the media-to-be-scanned 404 (or paper 304). The scanner bracket 410, in turn, supports the line scanner 402. The paper loading lever 408 can be used by the operator to lift the scanner assembly away from the cover 204 to make the loading of paper easier. An adjustable counter-balance spring mechanism (not shown) may be attached to an end of the scanner assembly 400 and to the printer assembly 324 to adjust (increase or decrease) the force applied to the paper 304 it moves past the scanner assembly 400.

Figure 4B:
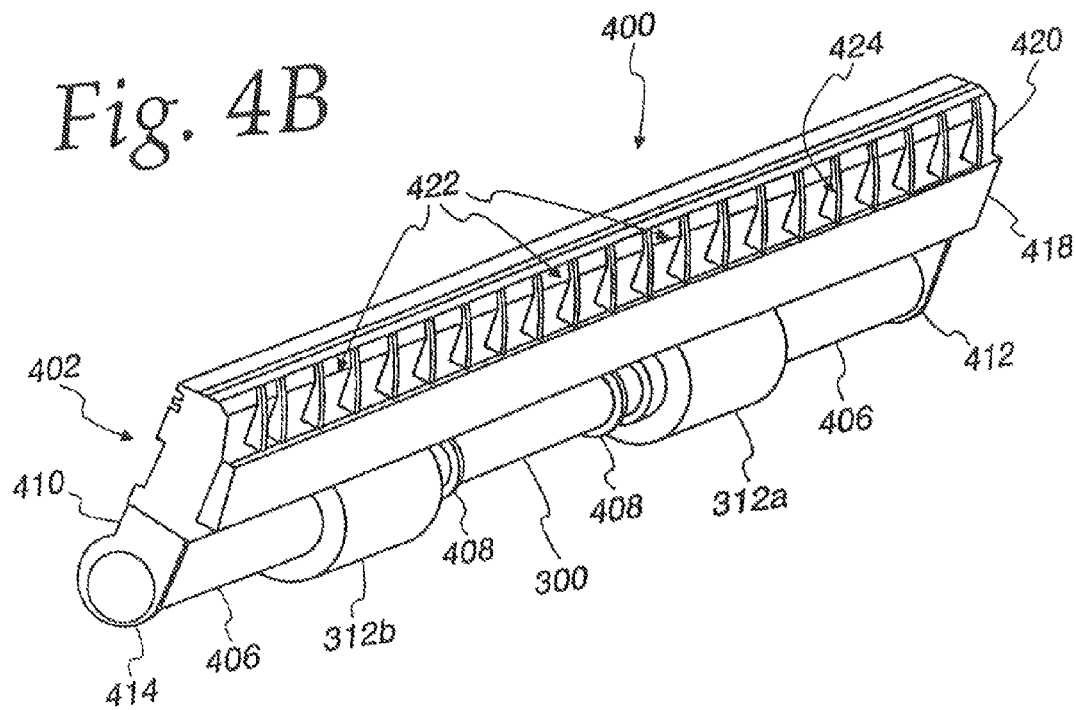
FIG. 4B is another perspective view of the floating scanner assembly shown in FIG. 4A.

FIG. 4B illustrates a reverse perspective view of one embodiment of the floating scanner assembly 400 shown in FIG. 4A. In this perspective view, the line scanner 402 is shown cantilevered away from the pick shaft 300 by the scanner bracket 410. The floating scanner assembly 400 may be hingedly mounted or secured to the paper feed and handling mechanism supported within the base 202 (see FIGS. 3, 5, 5A and 5B). This hinged or flexible arrangement allows the entire floating scanner assembly 400, and the line scanner 402 in particular, to be consistently and repeatably positioned flush and/or adjacent to the media-to-be-scanned 404/paper 304.

The line scanner 402 includes a glass and/or translucent plate 418. The glass plate 418 is secured to the underside of the floating scanner assembly 400 and is arranged to slideably engage the media-to-be-scanned 404/paper 304 positioned within the document feeder 212. The glass plate 418 ensures that the media-to-be-scanned 404/paper 304, at the point the line scanner 402 is scanning, is flat, i.e., wrinkle free, and ready to be scanned. Thus, the glass plate 418, supported by the line scanner 402 and the floating scanner assembly 400, rides smoothly along the surface of the media-to-be-scanned 404. Moreover, the thickness of the glass plate 418 ensures that the proper/desired focal length of the line scanner 402 is maintained relative to the surface of the media-to-be-scanned 404. By changing the thickness of the glass plate 418, the line scanner 402 can be moved closer to, or farther away from, the media-to-be-scanned 404 thereby changing the focus of the line scanner 402.

The floating scanner assembly 400 further includes a media guide 420 positioned adjacent to the glass plate 418 on the underside of the assembly. The media guide 420 may be a solid guide that includes a tapered leading edge, or may include multiple ridges or guides 422 that each include a tapered leading edge 424. Regardless of the specific configuration, the tapered leading edge 424 is arranged to engage and/or (cooperate with the leading edge 304a of the paper 304. (or the media-to-be-scanned 404) when it is positioned within the document feeder 212. For example, when multiple pieces of media or paper 304 are inserted within the document feeder 212, the leading edge 304a of the paper 304 contacts and forces the entire floating scanner assembly 400 to align and flushly engage the surface of the top-most piece of paper 304. Thus, regardless of how many pieces of media or paper 304 are placed within the document feeder 212, the floating scanner assembly 400 and the line scanner 402 are consistently resting on the surface of the media-to-be-scanned 304.

Figure 5:
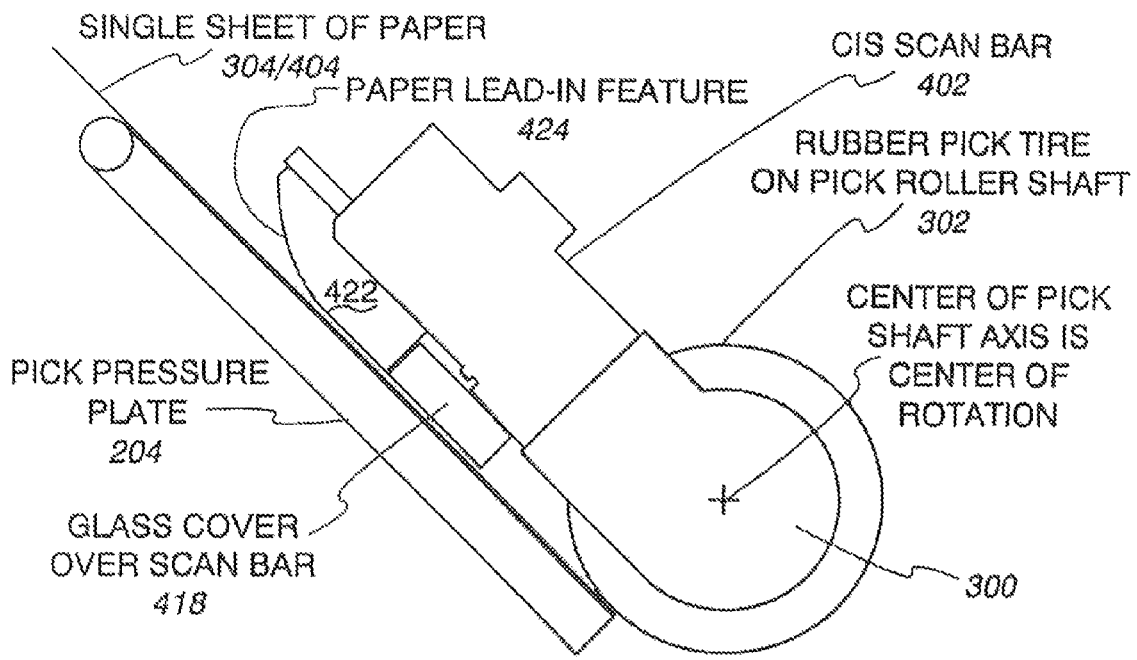
FIG. 5 is a side view of one embodiment of the floating scanning assembly in a substantially unloaded configuration.
Figure 5A:
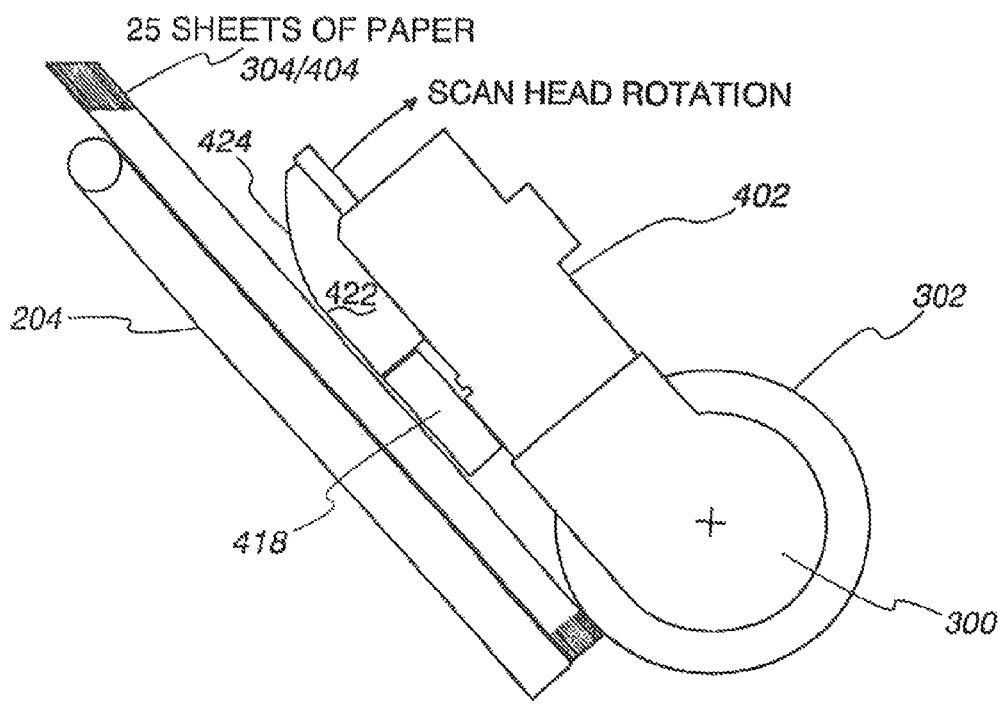
FIG. 5A is a side view of one embodiment of the floating scanning assembly in a moderately loaded configuration.
Figure 5B:
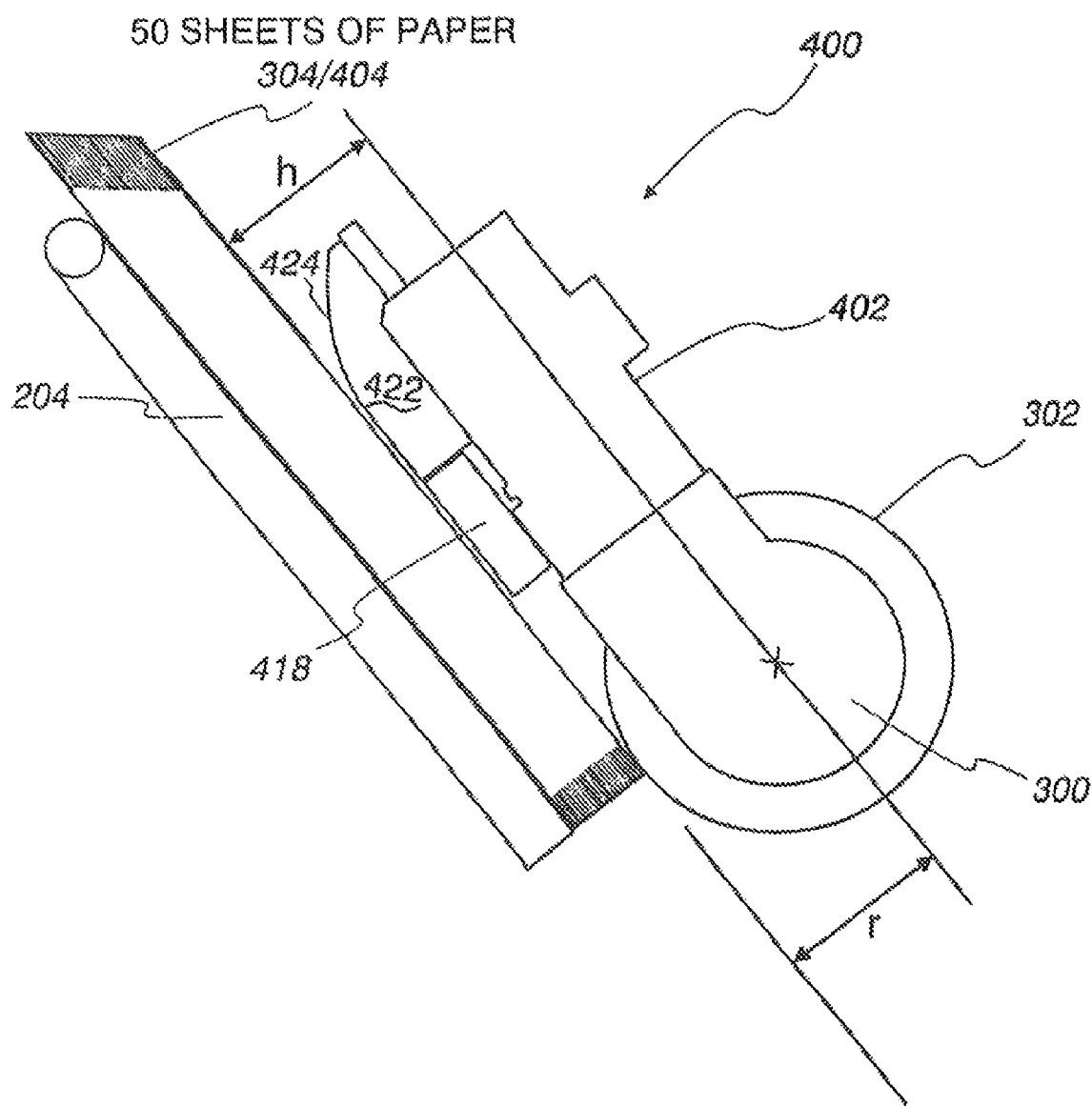
FIG. 5B is a side view of one embodiment of the floating scanning assembly in a substantially loaded configuration.

FIGS. 5, 5A and 5B illustrate the floating scanner assembly 400 aligned and pivotably coupled to the pick shaft 300 and pick roller 302. In particular the scanner bracket 410 (see FIGS. 4 and 4A) is secured to the centerline of the pick shaft 300 and pick roller 302 and supports and aligns the line scanner 402 and glass plate 418 along the same. In this configuration, the line scanner 402 and glass plate 418 are arranged to ensure that the focal length of the scanner (h) is equal to the radius (r) of the pick shaft 300 and pick roller 302 (see FIG. 5B, r=h). Thus, when the pick shaft 300 and pick roller 302 are displaced by multiple sheets of paper 304 or media-to-be-scanned 404, e.g., a single sheet in FIG. 5; twenty-five sheets in FIG. 5A and fifty sheets in FIG. 5B, the floating scanner assembly 400 and the tine scanner 402 are displaced and maintained at the same focal distance from the surface of the paper 304. This is because the surface of the top sheet of paper 304 placed within the document feeder 212 is always tangent to the pick roller 302. The floating scanner assembly 400 which is mounted to the pick roller 302 at a distance equal to the radius of the pick shaft 300 and pick roller 302 is similarly aligned tangent to the surface of the top sheet of paper 304.

FIG. 6 is a flow chart illustrating one example of the functions or steps that may be performed during the operation of the MFP 200. At block 600, the desired multi-function printer functions are selected. For example, a print function 600a may be automatically selected based on media type or orientation to create hard copies of stored information, received facsimiles, or information received from a connected device such as s personal computer or personal digital assistant. Alternatively, a scan function 600b may be manually selected using one or more of the controls 206 to image or process information from media stored/positioned with the document feeder 212.

At block 602, the line scanner 402 can be activated as part of the scan function 600b. Activation of the line scanner 402 may cause a processor to implement program logic stored on a communicatively connected memory. The program logic may include, for example, subroutines to control the scan interval and resolution of the line scanner 402, subroutines to process and correct the scanned image, and subroutines to store the processed image information in a storage location.

At block 604, the drive motor may engage and rotate the pick roller 302 and the pick shaft 300. The pick roller 302 may, in turn, frictionally grab the media-to-be-scanned 404. The media-to-be-scanned 404 is moved and/or urged along the common feed path P. The movement of the media-to-be-scanned 404 causes the information, image and/or text thereon to pass in front of the line scanner 402.

At block 606, the information, image and/or text scanned by the line scanner 402 as the media-to-be-scanned 404 passes, may be stored. At block 608, the information is stored in a persistent or semi-persistent storage location for later use and/or processing. The persistent or semi-persistent storage location may be a memory card such as, an SD card or a CF card, may be a hard drive or optical storage medium, or any other known information storage device or medium.

At block 610, the media-to-be-scanned 404 is transported along the common feed path P, to allow the line scanner 402 to capture the information stored thereon.

At block 612, the rollers 306 and 310 can be sequentially started. By sequentially starting the rollers 306 and 310, these rollers can be traveling at the same radial velocity when the media-to-be-scanned 404 is handed off from the pick roller 302 at block 614. Thus, the media-to-be-scanned 404 will not experience a sudden change in velocity along the common feed path P. Sudden changes in velocity could result in unwanted movement of the media-to-be-scanned 404 which, in turn, may result in scan artifacts or discrepancies being recorded by the line scanner 402.

At block 616, the media-to-be-scanned 404, having been scanned and otherwise processed, can be outputted from the MFP 200 via the media outlet 210.

If, at block 600, the print function 600a is selected, then the print assembly 324 may be activated. Activation of the print assembly may cause the processor to implement program logic stored on a communicatively connected memory. The program logic may include, for example, subroutines to control movement of the print assembly 324, subroutines to process and correct the placement and dispersal of ink and/or toner, and subroutines to manipulate the stored or received image information.

At block 618, the drive motor may engage and rotate the pick roller 302 and the pick shaft 300. The pick roller 302 may, in turn, frictionally grab the paper 304 stored within the document feeder 212. The paper 304 is moved and/or urged along the common feed path P.

At block 620, the paper 304 is transported along the common feed path P, to the print area 314.

At block 622, information stored in the persistent or semi-persistent storage location may be received and/or inputted by the printer assembly 324 use. Alternatively, the information may be data transmitted from a communicatively coupled personal computer or other device, or may be received directly from the scanner assembly 400, etc.

At lock 624, the print assembly 324 and the print head 316 can utilized the received information to deposit ink or toner onto the paper 304 to create a hard copy of the information.

At block 616, the paper 304 processed by the printer assembly 324 can be outputted from the MFP 200 via the media outlet 210.

It should be understood that various changes and modifications to the presently preferred embodiments described herein will be apparent to those skilled in the art. Such changes and modifications can be made without departing from the teachings of the present invention and without diminishing its intended advantages. It is therefore intended that such changes and modifications be covered by the appended claims.

What is claimed is:

1. A multi-function printer system comprising:
   a document feeder configured to support a medium;
   a pick mechanism configured to engage the medium; and
   a floating scanner assembly pivotably coupled to the pick mechanism;
   wherein the pick mechanism and the floating scanner assembly are arranged to flushly engage a surface of the medium when the medium is supported within the document feeder.

2. The system of claim 1 further comprising:
   a printer assembly the printer assembly in communication with the document feeder and the pick mechanism, and wherein the printer assembly is configured to cooperate with the medium.

3. The system of claim 1 wherein the floating scanner assembly is a line scanner.

4. The system of claim 1, wherein the pick mechanism includes:
   a pick shaft; and
   a pick roller coupled to the pick shaft.

5. The system of claim 4, where in the pick shaft and the pick roller include a centerline spaced away from the surface of the medium by a first distance, and wherein the floating scanner assembly is spaced away from the surface of the medium by a second distance such that the first and second distances are substantially equal.

6. The system of claim 1, wherein the floating scanner assembly includes a guide.

7. The system of claim 6, wherein the guide includes a plurality of guides having tapered leading edges, wherein the plurality of guides are positioned substantially adjacent to a plate coupled to the floating scanner assembly.

8. The system of claim 1, wherein the floating scanner assembly is coupled to the pick mechanism using a bracket configured to space a focal length of the floating scanner assembly and a centerline of the pick mechanism equidistantly from the surface of the medium.

9. A method for configuring a multi-function printer, the method comprising:
   providing a document feeder configured to support at least one piece of medium;
   providing a pick mechanism having a pick roller, the pick roller having a centerline and a surface, wherein the surface is configured to engage a surface of the at least one piece of medium; and
   providing a floating scanner assembly pivotably mounted to the pick roller.

10. The method of claim 9 further comprising:
    providing a print mechanism in communication with the document feeder and the pick mechanism.

11. The method of claim 9, wherein providing the floating scanner assembly further comprises:
    providing a line scanner having a focal length;
    aligning the line scanner relative to the pick roller and the surface of the at least one piece of medium such that the focal length of the line scanner is substantially equal to the centerline of the pick roller relative to the surface of the at least one piece of medium.

12. The method of claim 11, wherein providing the line scanner further comprises:
    pivotably mounting the line scanner along the centerline of the pick roller.

13. The method of claim 9 further comprising:
    providing a print mechanism in communication with the document feeder and the pick mechanism; and
    pivotably mounting the pick mechanism relative to the at least one piece of medium supported within the document feeder.

14. A multi-function printer comprising:
    means for feeding documents configured to support a medium;
    means for picking documents configured to engage the medium; and
    means for scanning pivotably coupled to the means for picking documents;
    wherein the means for picking documents and the means for scanning are arranged to flushly engage a surface of the medium, when the medium is supported within the means for feeding documents.

15. The system of claim 14 further comprising:
    means for printing in communication with the means for feeding documents and the means for picking documents, and wherein the means for printing is configured to cooperate with the medium.

16. The system of claim 14, wherein the means for scanning is a line scanner.

17. The system of claim 14, wherein the means for picking documents includes:
    a pick shaft; and
    a pick roller coupled to the pick shaft.

18. The system of claim 17, wherein the pick shaft and the pick roller include a common centerline spaced away from the surface of the medium by a first distance, and wherein the means for scanning is spaced away from the surface of the medium by a second distance, wherein the first and second distances are substantially equal.

19. The system of claim 14, wherein the means for scanning further comprises a guide.

20. The system of claim 19, wherein the guide includes a plurality of guides having tapered leading edges, wherein the plurality of guides are positioned substantially adjacent to a front edge of the means for scanning.

21. The system of claim 14, wherein the means for scanning is mounted to the means for picking documents using a bracket configured to space a focal length of the means for scanning and a centerline of the means for picking documents equidistantly from the surface of the medium.

* * * * *